INVENTOR
FREDERIK BARFOD
EMIL O. WIRTH
BY A. R. McCrady
ATTORNEY

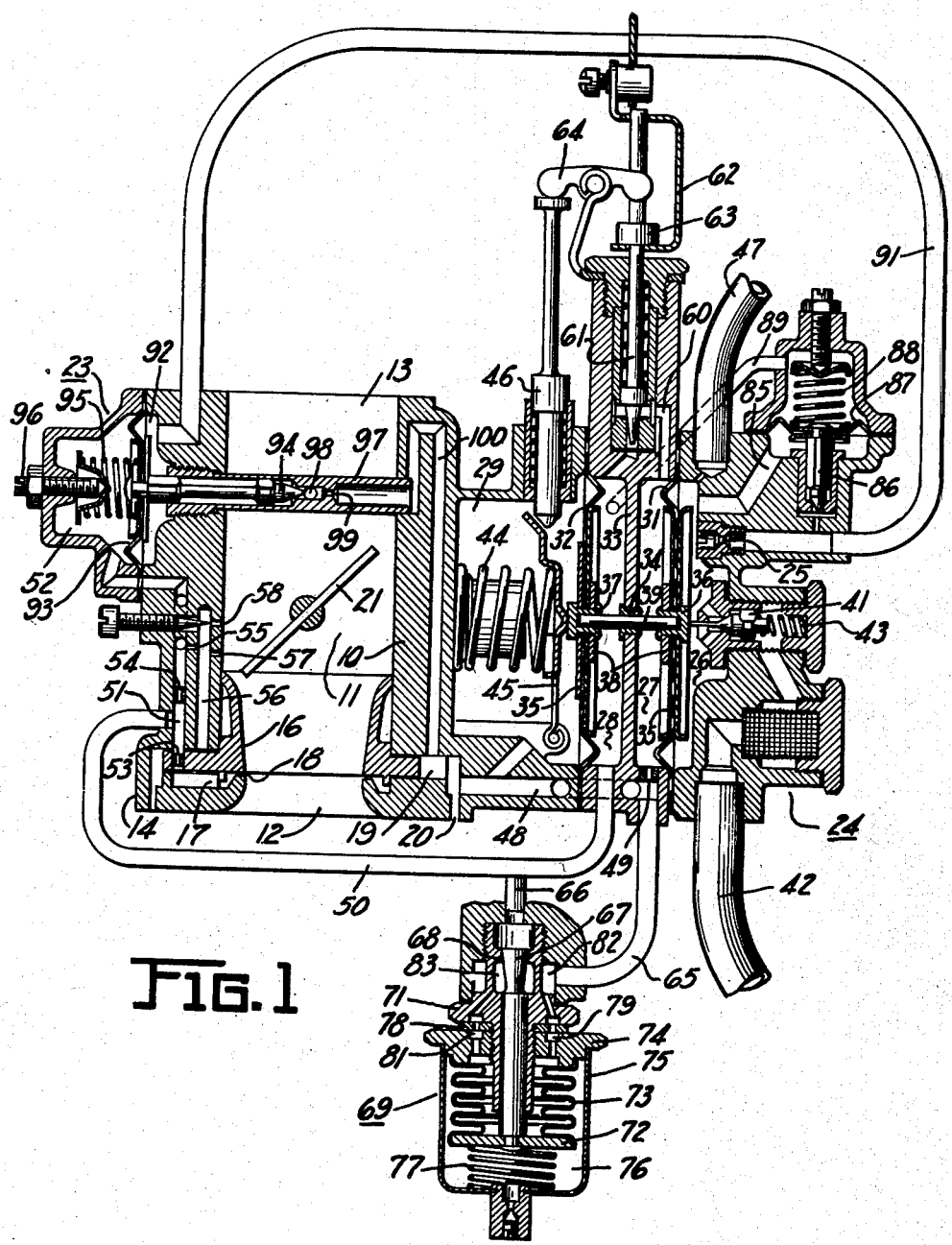

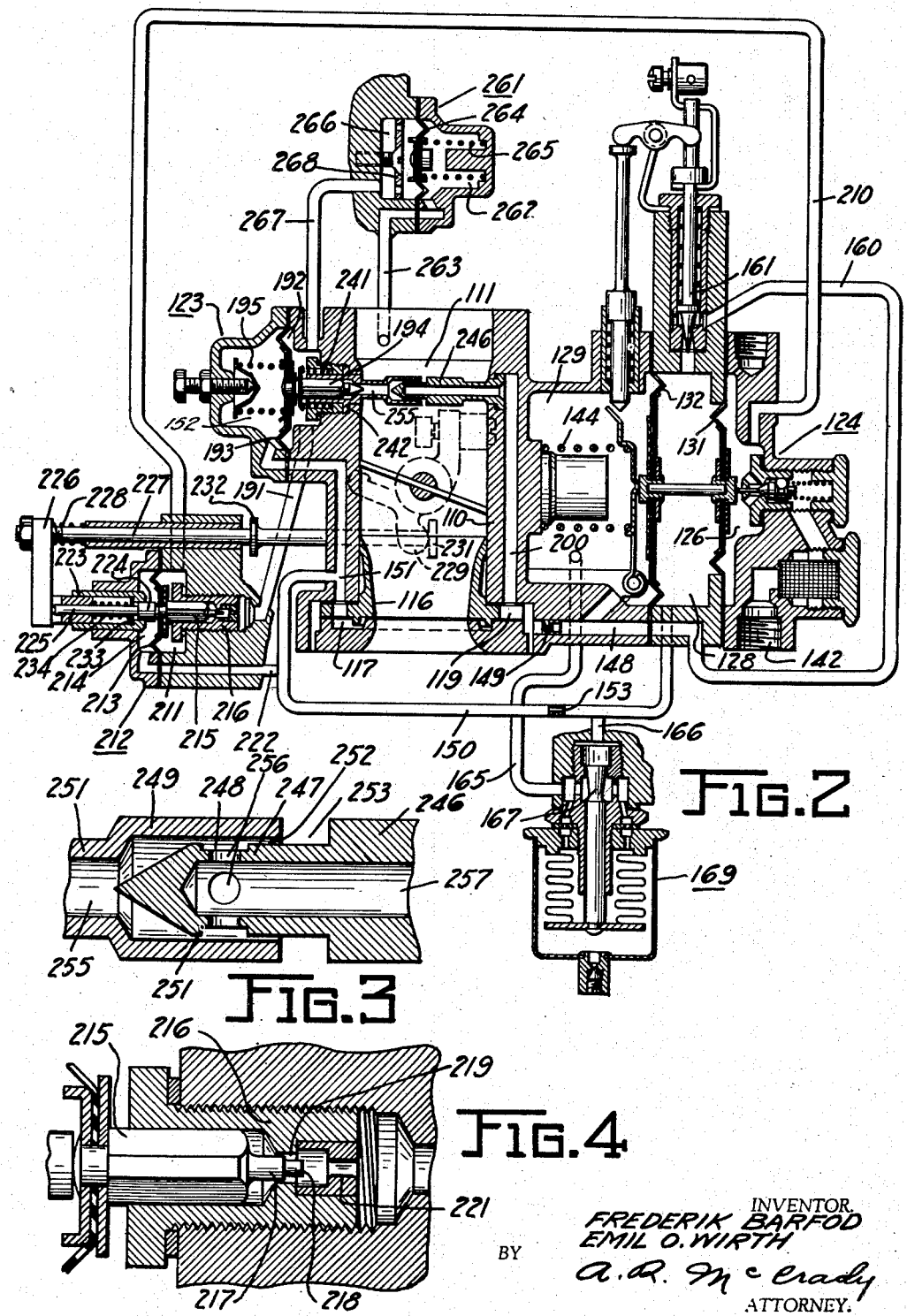

Patented July 27, 1948

2,445,846

UNITED STATES PATENT OFFICE 2,445,846

FUEL SUPPLY SYSTEM

Frederik Barfod and Emil O. Wirth, South Bend, Ind., assignors to Bendix Aviation Corporation, South Bend, Ind., a corporation of Delaware Application July 22, 1942, Serial No. 451,920

19 Claims. (Cl. 261—69)

This invention relates to fuel feeding systems for internal combustion engines and more particularly to devices or systems in which liquid fuel is supplied thereto under superatmospheric pressure and is metered while being maintained under pressure.

One of the principal objects of the invention is to provide a simplified device of this character which may be built at reasonable cost and which is capable of accurately regulating the fuel supply to maintain a proper fuel to air ratio through wide ranges of engine load, speed, and variations in altitude as are experienced with an aircraft engine.

Another object of the invention is to eliminate boiling of the fuel under high temperature or altitude conditions to thereby insure accurate metering. This is accomplished by maintaining the fuel under positive pressure until it is discharged into the air supply to form a combustible mixture for the engine.

Another object of the invention is to eliminate the formation of ice in the air supply passage. This is accomplished by injecting the fuel into the air supply posterior to the throttle.

It is a further object to finely atomize the fuel discharged into the air stream to produce an improved mixture capable of being readily ignited even though the engine is cold.

It is a further object of the invention to provide an air-bled discharge nozzle in which any tendency to form ice in or adjacent the nozzle does not affect the quantity of fuel discharged.

It is a further object of the invention to provide a fuel feeding device or system which will operate properly in any position so that when installed on aircraft the engine will be properly supplied with fuel regardless of the position of flight.

Further objects of the invention relate to modification of the fuel control in accordance with variations in the barometric pressure of air supplied to the engine, and to the provision of an improved economizer control to vary the richness of the mixture under high power output operating conditions.

Still further objects of the invention relate to an improved idle system for securing accurate fuel metering during operation at or near idle, and to the provision of an improved idle cut-off for stopping the flow of fuel when the engine is to be stopped.

Other objects and advantages of the invention will be readily apparent to one skilled in the art from the following description taken in connection with the accompanying drawings, which represent preferred embodiments. After considering these embodiments skilled persons will understand that many variations may be made without departing from the principles disclosed; and we contemplate the employment of any structures, arrangements, or modes of operation that are properly within the scope of the appended claims:

Figure 1 is a diagrammatic sectional view of one embodiment of the invention;

Figure 2 is a similar view of another embodiment of the invention;

Figure 3 is an enlarged partial view in section of the discharge nozzle shown in Figure 2;

Figure 4 is an enlarged partial view in section of the idle and economizer needle valve of the embodiment shown in Figure 2;

Figure 5:
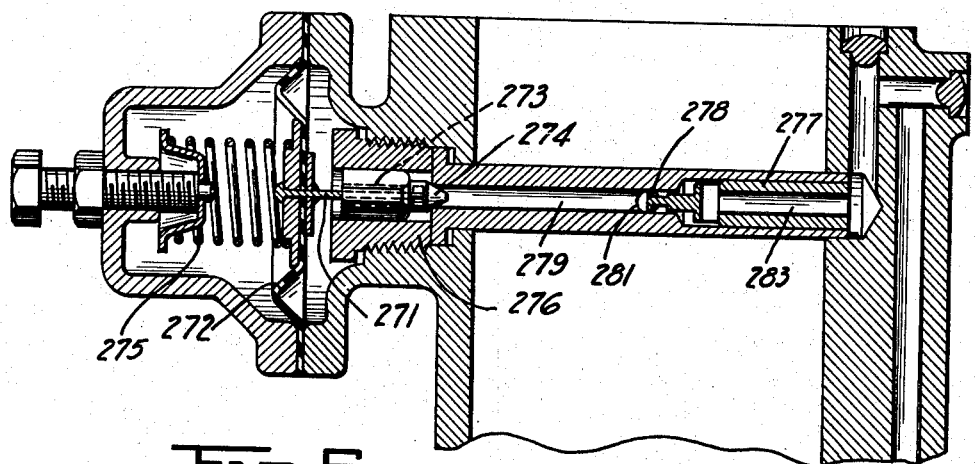
Figure 5 is an enlarged partial view in section of a modified form of discharge nozzle.

With reference to Figure 1, a main body member 10 contains an induction passage 11 therethrough having an air inlet 12 and an outlet 13, the air inlet being provided with an outer surface 14 to which an air scoop (not shown) opening in the direction of travel may be secured and the outlet being provided with flanges (not shown) for securing the body member 10 to the manifold of an internal combustion engine or to the inlet of a supercharger if one is used between the carburetor and the manifold. If desired, a supercharger may be used anterior to the body member 10 either in place of or in addition to a supercharger posterior to the said body member. A venturi 16 having separable inlet and outlet sections is positioned in the induction passage adjacent the inlet 12 and is formed with an annular chamber 17 which communicates with the interior of the venturi through annular slot 18 to be thereby subjected to Venturi depression. An annular chamber 19 is in free communication with the air entering the venturi through an annular opening 20, the opening 20 being preferably subjected to the impact pressure of the air supplied to the venturi. A throttle 21 is pivotally mounted in the induction passage posterior to the venturi and is adapted to be manually actuated to control the air flow to the engine.

The fuel flow to the engine is regulated or controlled by an unmetered fuel pressure control unit or regulator, indicated generally at 24, which regulates or determines the fuel pressure on the upstream side of a fuel metering orifice 25, and by a discharge nozzle indicated generally at 23 which regulates or determines the pressure on the downstream side of the metering orifice 25.

The interior of the control unit 24 is divided into four chambers 26, 27, 28 and 29 by a pair of preformed annularly grooved diaphragms 31, 32 and an apertured partition 33, the aperture containing a hollow rivet-like bearing member 34. The center portions of the diaphragms are supported by thin plates 35 between which the diaphragms are clamped by the centrally disposed cylindrically recessed rivets 36, 37. Washers 38 are preferably provided under the deformed end of the rivets so that the thin plates will not tear loose from the riveted over portion of the rivets. The ends of a pin or rod 39 freely slidable in the bearing member 34 are freely received in the recesses of the rivets and are preferably provided with rounded ends to form angularly adjustable one-way connections with the diaphragms whereby slight misalignment of the diaphragms may be accommodated without binding. This construction also greatly facilitates assembly and disassembly of the control unit 24.

The chamber 26 is provided with a fuel inlet port controlled by a valve 41 and receives fuel from a source of fuel under pressure, such as a fuel pump, through a pipe 42. The valve 41 has a pin-like extension projecting into the chamber 26 in position to be engaged by the head of rivet 36 whereby movement of the diaphragms to the right opens the valve. A light spring 43 urges the valve toward its closed position. A spring 44 is mounted at one end in the chamber 29 and has its free end received in a spring retainer portion of a lever 45 pivotally mounted at one end and having a crimped center portion normally engaging the head of rivet 37 and urging the diaphragms to the right in a direction to open the valve 41. The spring 44 may be rendered inoperative when the engine is to be stopped by a plunger 46 which upon downward movement thereof engages the free end of lever 45 and moves the lever to the left against the force of spring 44. The lever 45 is thus moved out of engagement with the rivet 37 whereby the light spring 43 may close the valve 41 and cut off the fuel supply to the engine. A pipe 47 having a restricted communication with the top of chamber 26 and leading back to the fuel supply tank, or directly to atmosphere if desired, may be provided for eliminating vapors from the fuel chamber 26.

The chambers 29 and 27 are in communication with a passage 48 leading to the annular chamber 19 subjected to entering air pressure. A restriction 49 may be provided if desired to partially restrict the inflow of air to chamber 27. The chamber 28 is connected to the Venturi annular chamber 17 through a pipe 50 and a passage 51 in the wall of the body 10 which also leads to a chamber 52 in the discharge nozzle 23. A pair of calibrated restrictions 53, 54 may be provided in passage 51 on opposite sides of the point of junction of the pipe 50 and passage 51. A calibrated port 55 connects the passage 51 to a chamber 56 which is connected in turn to the induction passage by a port 57 and an adjustable area port 58. The ports 57 and 58 enter the induction passage adjacent the leading edge of the throttle 21 respectively anterior and posterior to the throttle when in a fully closed position.

A calibrated passage 60 interconnects the chambers 27 and 28 and is controlled by a spring closed manual mixture control valve 61 adapted to be opened any desired amount from the pilot's compartment by a cable actuated member 62. The stem of valve 61 is provided with a collar 63 which engages a pivoted lever 64 to force the plunger 46 downwardly when the mixture control valve is moved beyond its wide open or lean position to its idle cut-off position. The chamber 27 is also connected to the chamber 28 and to the Venturi annulus 17 by means of pipes 65, 66 and the pipe 50, the communication between pipes 65 and 66 being controlled by a tapered valve member 67 and its cooperative seat portion 68 of an automatic mixture control unit indicated generally at 69 which is responsive to variations in altitude.

The automatic mixture control unit includes a plug 71 which carries the seat portion 68 and is screwed into any desired fixed member, which may be the body 10. The stem of valve 67 is slidably received within the plug 71 and is secured to an end closure member 72 of a corrugated bellows 73, the other end of which is secured to a base 74 to which a cap 75 is also secured. The bellows and cap form walls of a sealed chamber 76 which may be evacuated to any desired degree. By controlling the degree of evacuation, the pressure and temperature responsiveness of the bellows may be correlated as desired. If desired a small quantity of volatile fluid may be used in chamber 76 to aid in obtaining the desired temperature responsiveness. A spring 77 prevents the bellows from fully expanding in response to the decreased pressure within the chamber 76. The base 74 is threadedly secured to the plug 71 and is separated therefrom by shims 78, the number or thickness of which may be readily varied to adjust the zero setting of the valve 67 relative to the seat portion 68.

Oppositely disposed ports 79 and 81 connect the interior of the bellows 73 with annular chambers 82 and 83 whereby air from the air inlet in passing through the pipes 65, 66 is made to circulate through the interior of the bellows, thereby making the control unit 69 quickly responsive to changes in the temperature and pressure of the air entering the venturi. The unit 69 may if desired be placed closely adjacent or in the air inlet so as to be in direct contact with the entering air. If desired, the annular chambers 82 and 83 may be in direct communication; and ventilation, if desired, may be provided by other means. Similarly, the interior of the bellows 73 may be connected directly to the inlet rather than through the passages 65, 48.

For enriching the mixture under conditions of high power output, there is provided a calibrated by-pass passage 85 around the metering orifice 25 which is closed by a valve 86 connected to a diaphragm 87 and urged onto its seat by an adjustable spring 88. The diaphragm 87 is adapted to open the valve 86 when the differential between the fuel pressure in chamber 26 acting on the lower surface of the diaphragm 87 and the pressure in chamber 28 transmitted to the upper surface of the diaphragm through passage 89 exceeds a predetermined value.

Fuel passing through the metering orifice 25 or the by-pass passage 85 is transmitted through a pipe 91 to a chamber 92 in the discharge nozzle 23 which is separated from the chamber 52 by a preformed annularly grooved diaphragm 93 connected to a fuel outlet valve 94 and urged to the right in a direction to close the valve by a spring 95 arranged to be variably loaded by an adjustment screw 96. The stem of valve 94 is of triangular cross section or otherwise relieved to permit fuel flow therepast and is slidable within a nozzle bar 97 threadedly received in the body 10 and extending transversely across the induction passage 11. Centrally disposed transversely opening discharge ports 98 receive fuel past the valve 94 and receive air through a calibrated restriction 99 and a passage 100 from the annular chamber 19. The seat of valve 94 is preferably closely adjacent the discharge ports 98 to maintain the fuel at superatmospheric pressure until it is delivered to the discharge ports. The air supplied to the discharge nozzle just anterior to the discharge ports serves both to create an emulsion to assist in the atomization of fuel and also to partially destroy, and so decrease the limits of variation in, the suction transmitted through the discharge ports 98 which in acting upon the tip of valve 94 in variable amounts tends to interfere with proper metering, particularly during idling operation.

The operation of the device disclosed in Figure 1 is as follows: Assuming the carburetor has not been filled with fuel and the idle cut-off plunger 46 is in its upper position as shown, the spring 44 will urge the diaphragms to the right and open valve 41. Fuel under pressure supplied to pipe 42 enters and fills chamber 26 and flows through orifice 25 and pipe 91 to the chamber 92. As the pressure in chamber 26 increases it acts against the diaphragm 31 and tends to compress spring 44 whereby the valve 41 tends to close. Fuel under pressure supplied to chamber 92 acts on diaphragm 93 and tends to open valve 94. The screw 96 is normally adjusted to compress spring 95 to such a point that a slightly lower pressure is required in chamber 92 to open the valve 94 than is required in chamber 26 for sufficiently compressing the spring 44 to permit the valve 41 to close. Once the carburetor has been fully filled with fuel, fuel will therefore slowly spill from the discharge ports 98 unless the lever 62 is actuated and the plunger 46 forced downwardly to compress spring 44 and so allow valve 41 to close. The air passage 100 is preferably formed with an inverted U-shaped portion extending above the level of the discharge orifices 98 to prevent fuel from running back into the annular chamber 19. Although the screw 96 has been described as being adjusted to permit valve 94 to open at a pressure somewhat less than the closing pressure for valve 41, it will be apparent that by screwing the adjustment screw 96 in or out the pressure in chamber 92 required to open valve 94 may be made greater than, equal to or less than the pressure required in chamber 26 to permit valve 41 to close. It will also be apparent that the actual value or degree of the fuel pressures will be determined by the strength of the springs 44, 95, the pressures required being greater as the strength of the springs is increased.

During cranking with the carburetor full of fuel and the idle cut-off plunger 46 in its upper position and the throttle 21 in its idling position, engine suction is transmitted through the port 58, chamber 56, port 55, to the passage 51 and to the discharge nozzle chamber 52. The cranking suction effective at port 58 is transmitted to chamber 52 in reduced amount due both to the bleeding of air into the chamber 56 through the port 57 and to the bleeding of air into passage 51 through the restriction 53 from the chamber 17. The moderate suctions so transmitted to chamber 52 open the valve 94 an additional amount and so reduce the metered fuel pressure being maintained in chamber 92. The suction in passage 51 is transmitted through the restriction 54 and passage 50 to chamber 28 where it urges the diaphragms to the right in aid of the spring 44, thereby opening the valve 41 a slight additional amount and requiring a slightly increased unmetered fuel pressure in chamber 26 to balance it and the force of spring 44. The resulting increase in unmetered fuel pressure and the decrease in metered fuel pressure obviously increase the quantity of fuel flowing through the orifice 25 and discharging into the induction passage 11.

The effectiveness with which engine suction is transmitted through ports 58, 57 and 55 to the chambers 52 and 28 may be readily controlled by controlling the size of restrictions 54 and 53. The initial unmetered to metered differential fuel pressure determined by the setting of spring 95, as modified by the increase in unmetered fuel pressure and the decrease in metered fuel pressure resulting from cranking suctions, determines the quantity of fuel supplied during cranking and is arranged to provide a proper mixture with the air drawn into the engine during cranking whereby the engine may be readily started. If desired, primers or other devices for facilitating starting may be provided.

During operation at sea level, and disregarding for the time being the effect of idle ports 57, 58, the air flow through the venturi 16 creates a differential between the impact pressure in chamber 19 and the pressure in Venturi chamber 17 which varies as a function of the rate of air flow through the induction passage. The pressures in the Venturi chamber 17 and in the impact chamber 19 are respectively transmitted to the chambers 28 and 52, and chambers 27 and 29, and control the opening of valves 41 and 94 so as to regulate the flow of fuel to maintain a differential between the unmetered and metered fuel pressures which is in fixed proportion to the venturi to impact differential air pressure. With the arrangement shown in Figure 1 in which the diaphragms 31 and 32 are of equal size, the fuel metering differential pressure is maintained substantially equal to twice the air differential pressure. Thus a given decrease in the pressure at the Venturi chamber 17 is transmitted to chamber 28, where it results in an equal increment increase in the unmetered fuel pressure, and is transmitted to chamber 52, where it results in an equal increment decrease in the metered fuel pressure. Consequently the fuel metering differential pressure is increased an amount double that of the increase in air differential pressure. Similarly for a given increase in scoop pressure, the pressure in chambers 29 and 27 are correspondingly increased and since they act on diaphragms 31 and 32 in the same direction, the unmetered fuel pressure in chamber 26 is increased an increment double the increase in scoop pressure.

Although the diaphragms 31 and 32 are shown of equal size they may be of different sizes if desired, in which case the fuel metering differential will be some other multiple of the air metering differential. For example, if the diaphragm 32 is of an area double that of the diaphragm 31, the fuel differential will be maintained equal to three times the air metering differential. In any case, however, the fuel and air differential pressures will be maintained in constant proportion and as a consequence constant fuel to air proportioning is obtained. It may be further noted that the area of the diaphragm 93 may be selected as desired without effecting the metering, an increment change in pressure in chamber 52 causing an equal change in pressure in chamber 92 regardless of the diaphragm area.

At idling and near idling operation, the engine suction acting on ports 58 and 57 creates a small increase in the suction in chamber 52 and to a lesser extent in chamber 28 tending to increase the fuel metering differential pressure and enrich the mixture. This increase in the fuel metering differential pressure, although small in absolute value, represents a relatively large percentage increase in the differential which would otherwise be present as a result of the low air flow through venturi 17. As a consequence the richness of the mixture is increased a substantial amount as is required at idling. As the throttle is opened and the air flow and Venturi suction increase, the effectiveness of the idling ports 57 and 58 for richening the mixture diminishes and becomes negligible as the throttle is opened a substantial amount. By controlling the area of the ports 57 and 58 and their location relative to the throttle, and by properly correlating these factors with the initial unbalance between the pressures of the unmetered and metered fuel as determined by the springs 44 and 95, any desired metering characteristic can be obtained through the idling and near idling range.

As the throttle is opened and the power output of the engine increases, the Venturi pressure in chamber 28 decreases and the unmetered fuel pressure in chamber 26 increases. These pressures are transmitted to opposite sides of the diaphragm 87 and will open the valve 86 against the force of spring 88 when the differential therebetween reaches a predetermined value to thereby richen the mixture during periods of high power operation as is desired.

It is generally desirable to provide the pilot with a manual mixture control so that he can vary the richness of the mixture between predetermined limits. For this purpose the calibrated passage 60 controlled by the tapered valve 61 is provided, which with the valve closed corresponds to a rich setting. As the valve 61 is opened, air is bled from the air scoop chamber 27 into the Venturi chamber 28 whereby the differential pressure between these chambers is reduced an amount depending upon the extent the valve 61 is opened. This in turn reduces the unmetered fuel pressure in chamber 26 required to maintain the diaphragm assembly in an equilibrium position, thus reducing the fuel metering differential and consequently reducing the richness of the mixture for a given air flow. With the valve 61 completely withdrawn the carburetor is in its full lean position, the effective calibrated area of passage 60 determining the maximum permissible bleeding action.

The automatic mixture control unit 69, or altitude control unit as it is sometimes referred to, is provided to maintain a constant mixture richness with variations in altitude, and functions on substantially the same air bleed principle as the manual mixture control. Upon a decrease in the density of the air entering the venturi, as by increase in altitude, the differential between the entering air and Venturi pressures will increase for a constant weight of air flow per unit time and will tend to increase the fuel flow and richen the mixture. As the density decreases, however, the bellows 73 collapses, because of the decreased pressure within the bellows, and moves valve 67 upwardly to increase the area of communication between pipes 65 and 66. Air is thus bled into the Venturi chamber 28 to thereby reduce the differential pressure which would otherwise exist between the chambers 27 and 28, whereby the unmetered fuel pressure in chamber 26 is correspondingly decreased. By properly contouring the valve 67, the differential in the pressures in chambers 27 and 28 are so controlled that the fuel supplied to the engine remains constant for a given weight of air flow per unit time even though the entering air density changes. Automatic altitude compensation is thus obtained.

With the orifice 49 positioned as shown and properly proportioned relative to the orifice 53, the manual mixture control will function primarily to vary the pressure in chamber 27 to thereby vary the differential between the pressures in chambers 27 and 28; whereas, the automatic mixture control 69 will function primarily to vary the pressure in chamber 28 to thereby vary the said differential. If desired, however, the restriction 49 may be eliminated in which case both controls would tend to have their major effect upon the pressure in chamber 28; or, the restriction 49 may be used in the passage 48 to the left of its point of junction with pipe 65, in which case both controls would affect the pressures in both of chambers 27 and 28; or, with the restriction 49 in the latter position the restriction 53 may be eliminated, in which case both controls would tend to have their major effect upon the pressure in chamber 27.

When the engine is to be stopped it is desirable to cut off all fuel flow to the engine so that it will not continue to run, as a result of pre-ignition, after the ignition is turned off. To accomplish this end, the valve 61 is moved upwardly beyond its full lean position to an idle cut-off position at which the plunger 46 is forced downwardly by the lever 64 whereby the spring 44 is compressed and the light spring 43 is able to fully close valve 41.

The embodiment of Figure 2 is very similar to that of Figure 1, differing therefrom principally in the use of a modified diaphragm arrangement in the regulator unit, a modified idling and economizer system, and a modified discharge valve and nozzle construction. In Figure 2, in which parts corresponding to parts of Figure 1 have been given similar reference numerals with the addition of 100, the regulator unit 124 is divided into three chambers 126, 128 and 129 by the diaphragms 131 and 132. As shown the diaphragms 131 and 132 have an area ratio of one-half although, as will be apparent hereinafter, any desired area ratio may be used.

The chamber 128 of the regulator unit 124 is connected to the Venturi annulus 117 by means of the pipe 150 and passage 151 and is therefore subjected to a pressure primarily derived from the throat of the venturi 116. A restriction 153 may be provided in passage 150 if desired. The chamber 128 is also connected to the air scoop or Venturi entrance by means of the passage 160, controlled by the manual mixture control valve 161, the passage 148, which may be provided with a restriction 149, and the annular chamber 119. The chamber 129 of the regulator unit 124 is connected to the annular Venturi entrance chamber 119 by the passage 148 and is therefore subjected to a pressure primarily derived from the Venturi entrance. The chamber 129 is also connected to the venturi annulus 117 through passages 165, 166 and 150, the communication between passages 165 and 166 being controlled by the valve 167 of the automatic mixture control unit 169. Unmetered fuel entering the chamber 126 of the regulator from the fuel inlet 142 is transmitted through a pipe 210 to a chamber 211 of a fuel metering unit indicated generally at 212, and thence through the metering unit to a pipe 191 leading to the chamber 192 of the discharge nozzle 123.

The fuel metering unit 212, which determines the effective area of the fuel metering restriction under various conditions of operation, may be formed as a part of the main body 110, or of the regulator 124, or may be a separable unit secured to the body or regulator as desired. A diaphragm 213 separates the chamber 211 from a chamber 214 and is secured to a metering valve 215 (best shown in Figure 4) slidable in a plug 216 and having a double stepped end 217, 218 cooperating with a metering orifice 219 formed in the plug 216. If desired, a second orifice 221 may be provided to limit the flow of fuel when the valve 215 is entirely withdrawn from the orifice 219. As shown the orifice 221 is located in the plug 216; however, it may be placed at any desired point in either of the passages 191 or 210. The chamber 214 is connected to the Venturi annulus 117 by means of a pipe 222 and the passages 150, 151.

A cup member 223 forms a stop limiting movement of diaphragm 213 to the left and may be adjustably mounted as by threading. A piston 224 is slidably mounted in the cup member 223 and projects therethrough into abutting relation with the diaphragm 213 and valve 215 to thereby limit the permissible movement to the left of diaphragm 213 under the influence of the fuel pressure in chamber 211. The piston is provided with a reduced diameter extension 225 adapted to be engaged at idle by a cross-bar 226 adjustably secured to a slidably mounted rod 227 which is urged to the left by a spring 228 and is moved to the right at idle by a throttle lever finger 229 engaging a flange 231 on the rod 227. A stop 232 limits movement of rod 227 to the left at such times as the throttle is open beyond its idling or near idling positions. A washer 233, slidable within the cup member 223 is urged to the right against the bottom of the cup member by a preloaded spring 234. The washer is adapted to engage the shoulder of piston 224 to limit the movement to the left of piston 234, diaphragm 213, and valve 215, whereby as the throttle is opened beyond the near idling position the fuel pressure in chamber 211 moves the valve 215 to the left only sufficiently far to withdraw the step 217 from the orifice 219. During high power operation, however, the high unmetered fuel pressure in chamber 211 and the low Venturi pressure in chamber 214 create a sufficient pressure differential across the diaphragm 213 that the spring 234 is further compressed and the step 218 at the end of valve 215 is completely withdrawn from the orifice 219.

Thus during idling, with the parts as shown in Figures 2 and 4, the step 217 cooperates with the orifice 219 to limit the area for fuel flow. As the throttle is opened through the near idling range the valve 215 moves to the left until the piston 224 engages the washer 233, at which time the step 218 cooperates with the orifice 219 to limit the area for fuel flow during normal cruising operation. At high power output the step 218 is completely withdrawn from the orifice 219, at which time the orifice 219, or the orifice 221, or both, determine the effective fuel metering area.

In the device of Figure 2, it has been found desirable to adjust the discharge nozzle spring 195 sufficiently weaker, in proportion to the area of diaphragm 193, than the spring 144, in proportion to the area of diaphragm 131, so that at idle an excessively rich mixture is obtained, and then to decrease the richness of the idling mixture by decreasing the effective area of the metering orifice 219 during idling operation. It is for this reason that the valve 215 and rod 227 function to reduce the metering orifice area at idle. By controlling the rate at which the valve 215 is permitted to move to the left as the throttle is opened from its idle position, any desired near idling mixture richness can be obtained.

In the discharge nozzle 123 of Figure 2, the valve 194 is not fixed to the diaphragm 193 but is maintained in abutting relation therewith by means of a light spring 241 which constantly urges the valve 194 toward the left. This arrangement eliminates any tendency for the valve to bind in a valve guide and seat member 242 as a result of misalignment between the diaphragm and the guide member.

The discharge nozzle bar comprises a member 246 mounted in the wall of the body 110 which extends transversely of the induction passage 111 and is provided (Figure 3) with a reduced diameter end portion 247 having a groove 248 therein. The portion 247 projects into an enlarged portion 249 of a tubular extension 251 of the valve guide and seat member 242, the outer surface of the end 247 being substantially concentric with but spaced from the inner surface of the enlarged portion 249 to thereby form an annular fuel passageway 251 of limited flow capacity, an emulsion chamber formed by the groove 248, and a second annular passageway 252 of limited flow capacity which leads to an annular space 253 from which fuel emulsion is discharged into the induction passage 111. The tip of the end 247 is preferably pointed or otherwise formed so that fuel received past the valve 194 through the passage 255 will be readily directed outwardly to the annular passageway 251. Ports 256 connect the groove 248 with a bore 257 in the member 246 which receives air through passage 200 from the annular Venturi entrance chamber 119. Air freely supplied through ports 256 to the emulsion chamber formed by the groove 248 maintains the pressure in the said chamber at substantially atmospheric or entering air pressure regardless of variations in the suction in the induction passage 111 at the discharge annulus 253. With this arrangement the fuel pressure in passage 255, and consequently the fuel metering, is substantially unaffected by variations in the suction in the induction passage 111. In addition, the restricted annular passageway 252 functions as a critical flow nozzle at low manifold pressures corresponding to idling whereby fluctuations in manifold pressure, at a given fuel flow as determined by the regulator, are ineffective to vary the quantity of air being drawn through the ports 256. By this means a mixture of constant richness is provided even though the idling manifold pressure varies through rather wide limits.

An acceleration pump indicated at 261, which may be provided if desired, includes a suction chamber 262 connected through pipe 263 with the induction passage 111 posterior to the throttle. A diaphragm 264 urged to the left by a spring 265 separates the suction chamber 262 from a fuel chamber 266 connected through a pipe 267 with the fuel chamber 192 of the discharge nozzle 123. During periods of high engine suction operation the diaphragm 264 is moved to the right and fuel "robbed" from the chamber 192 is drawn into chamber 266. Upon a loss in engine suction as upon acceleration, the spring 265 forces the diaphragm to the left and pumps fuel from chamber 266 to the nozzle chamber 192 thereby temporarily richening the mixture. An adjustable stop 268 is provided whereby the stroke of the diaphragm 264 may be varied.

During operation, assuming the area ratio of diaphragms 132 and 131 is equal to two, the regulator unit 124 functions to maintain a differential fuel pressure across the metering unit 212 which is equal to twice the Venturi to entrance air differential pressure, thus accomplishing the same result as the regulator 24 of Figure 1 when the diaphragms 31 and 32 are of equal area. For example, a given decrease in the pressure at the Venturi chamber 117 is transmitted to chamber 128, where it results in an equal increment increase in the unmetered fuel pressure in chamber 126, and is transmitted to chamber 152, where it results in an equal increment decrease in the metered fuel pressure. Consequently the fuel metering differential pressure is increased an amount double the increase in the air differential. Similarly a given increase in the entering air pressure in chamber 119 is transmitted to chamber 129 and since it is applied to the diaphragm 132 having twice the area of diaphragm 131, the unmetered fuel pressure in chamber 126 is increased an increment double the increase in entering air pressure.

Although the diaphragms 132 and 131 are shown as having a two-to-one area relationship, they may be of any other desired area ratio, in which case the fuel metering differential pressure will be maintained at some multiple, other than two, of the air differential pressure. For example, if the area of diaphragm 132 is three times the area of diaphragm 131, the fuel differential will be maintained equal to three times the air metering differential. In any case, however, the fuel and air differential pressures are maintained in constant proportion and therefore constant fuel to air proportioning is obtained.

Opening the manual mixture control valve 161 or the automatic mixture control valve 167 partially destroys the differential in the pressures in chambers 128 and 129 and therefore leans the mixture for any given air differential at the Venturi 116, as has been fully described in connection with Figure 1.

In Figure 5, which discloses a modified form of discharge valve and nozzle bar, a short cable 271 is secured at one end to the nozzle diaphragm 272 and has its other end swedged or soldered in the bottom of a drilled hole 273 in the discharge valve 274. A two-way connection is thus provided between the diaphragm and valve which is sufficiently rigid to withstand the valve closing force of the nozzle spring 275 but is sufficiently flexible to accommodate slight misalignment between the diaphragm and the valve guide member 276.

In the nozzle bar of Figure 5 there is provided a member 277 having a thin transversely extending disc-like end 278 closely received in the fuel passage 279 and positioned in intersecting relation with the fuel discharge ports 281. The disc permits fuel and air, respectively supplied through passages 279 and 283, to reach the relatively large discharge ports 281 but prevents their commingling anterior thereto. The disc also deflects the fuel and prevents it from entering the passage 283 at heavy load when the vacuum in the induction passage tending to draw air through the passage 283 is relatively low.

The disclosed arrangement is also effective in preventing the formation and deposit of ice in the ports 281 which normally tends to clog the discharge port of an air bled nozzle. When the temperature and moisture content of the air being bled into the fuel are such that ice tends to form, the ice tends to be discharged into the induction passage as soon as it is formed, the air and fuel being confined by the ports 281 for but an instant. Under severe icing conditions, the moisture in the bled air tends to deposit as ice anterior to the disc 278. This cuts off the air bleed, and so arrests the icing tendency in the nozzle, but leaves the fuel passage unimpeded whereby the engine will continue to receive the proper amount of fuel and may continue to operate satisfactorily even though the fuel is not as finely atomized as before the air bleed passage became clogged.

Figure 6:
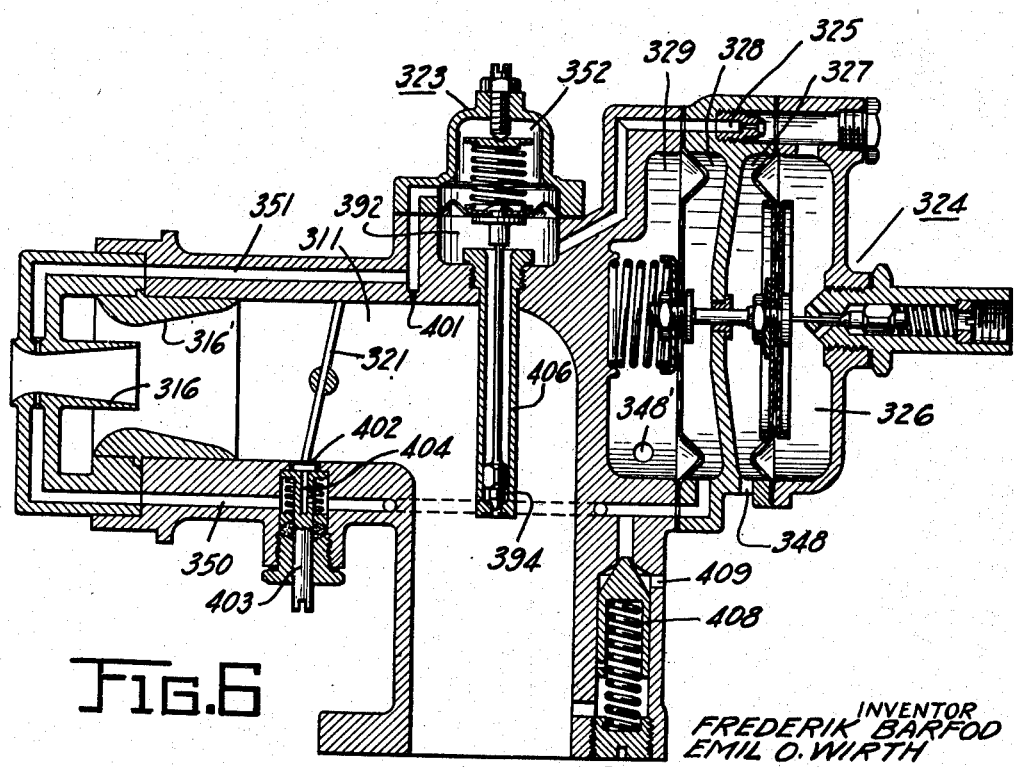
Figure 6 is a diagrammatic sectional view of a further embodiment of the invention applied to a horizontal inlet type of carburetor.

Figure 6 discloses a simplified carburetor of the horizontal air-inlet type which is basically similar to and functions in accordance with the same principles as the carburetor of Figure 1. In Figure 6, in which parts corresponding to parts of Figure 1 have been given corresponding reference numerals with the addition of 300, the air chambers 327 and 329 of the regulator 324 are vented directly to the atmosphere through ports 348 and 348', although if desired they may be vented to the inlet of the induction passage 311. Suction from the throat of the primary Venturi 316, positioned within a secondary Venturi 316', is transmitted through the passages 350 and 351 to the chambers 328 and 352 of the regulator 324 and the discharge nozzle 323 respectively. It will be apparent that a single Venturi may be used with the embodiment of Figure 6, if desired; and similarly, a double Venturi may be used with the embodiments of Figures 1 and 2. Engine suction transmitted through ports 401 and 402 is used to modify the suction in chambers 328 and 352 to vary the richness of the mixture at idle. The port 402 comprises a slot formed in the end of a spring pressed member 403 which may be rotated to position the slot relative to the leading edge of the throttle 321. A passage 404 in the member 403 connects the slot with the passage 350.

Fuel from the unmetered fuel chamber 326 of the regulator 324 is transmitted through the metering orifice 325 to the metered fuel chamber 392 of the discharge nozzle 323, and is discharged into the induction passage through a tube 406 projecting downwardly through the corner of the elbow-shaped induction passage and into the vertical leg thereof. The discharge valve 394 is preferably positioned adjacent the end of the tube 406 whereby the fuel is maintained under superatmospheric pressure up to its point of discharge into the air stream.

An engine suction actuated spring pressed piston and valve 408 controls the connection between a calibrated air bleed port 409 and the Venturi pressure chamber 328 of the regulator. At light loads when the engine suction is high the valve 408 is open and air is bled into the chamber 328 to partially destroy the suction in said chamber and thereby provide a relatively lean mixture. At heavy loads, the engine suction is insufficient to maintain the valve 408 open against the force of its spring and the valve 408 closes and cuts off the air bleed to the chamber 328, whereby the suction in the said chamber and consequently the richness of the mixture are increased as is desired during heavy load operation.

Although several modifications of the invention have been particularly described, each provided with specific features, it is obvious that these various features of one modification may be readily incorporated in the others. For example, each of the various idling arrangements may be used in any of the embodiments. Likewise the various discharge nozzles or other elements of the embodiments may be interchanged. It will also be understood that many changes might be made in the form and arrangement of the parts and it is not intended that the scope of the invention shall be limited to the forms shown and described nor otherwise than by the terms of the appended claims.

We claim:

1. In a fuel supplying device for an internal combustion engine, an air supply passage, a chamber subjected to the pressure in the air supply passage, a second chamber, flow responsive means in the air passage for creating a differential between the pressures in said chambers, a fuel supply conduit, area restricting means in the fuel supply conduit, a regulator unit for regulating the fuel pressure only on the upstream side of the area restricting means comprising a pair of air compartments, a passage connecting one of said compartments to one of said chambers, a pair of passages connecting the other of said compartments to both of said chambers, valve means controlling one of the said pair of passages, only one fuel compartment, said fuel compartment being subjected to the pressure in the fuel conduit on the upstream side of the area restricting means, a valve in the conduit anterior to the area restricting means, and pressure responsive members forming movable walls of the air and fuel compartments operative to control the valve, and a second regulating unit for regulating the fuel pressure only on the downstream side of the area restricting means comprising an air compartment connected to the said second chamber, a fuel compartment subjected to the pressure in the fuel conduit on the downstream side of the area restricting means, a valve in the conduit posterior to the area restricting means, and means responsive to the pressures in said last named air and fuel compartments for controlling the last named valve, the first mentioned regulator unit being operable independently of the fuel pressure on the downstream side of the restriction and the second mentioned regulator unit being operable independently of the fuel pressure on the upstream side of the restriction.

2. In a fuel feeding system for an internal combustion engine, an air supply passage and a fuel supply conduit, a venturi in the passage, a calibrated restriction in the conduit, a regulator unit for regulating the fuel pressure only on the upstream side of the restriction comprising a casing, a pair of spaced parallel diaphragms of different effective areas dividing the casing into three compartments, means for subjecting the end compartment formed by the smaller of the two diaphragms to the fuel pressure in the conduit on the upstream side of the restriction, a passage connecting the center compartment formed between the diaphragms to the venturi, a passage connecting the other end compartment to the air passage, and a valve in the conduit anterior to the restriction adapted to be controlled by the diaphragms, and a second regulator unit for regulating the fuel pressure in the conduit only on the downstream side of the restriction comprising a casing, a diaphragm dividing the casing into two compartments, means for subjecting one of the compartments to the fuel pressure in the conduit on the downstream side of the restriction, a passage connecting the other compartment to the venturi, and a valve in the conduit posterior to the restriction operably connected to the diaphragm, the first mentioned regulator unit being operable independently of the fuel pressure on the downstream side of the restriction and the second mentioned regulator unit being operable independently of the fuel pressure on the upstream side of the restriction.

3. The invention defined in claim 2 comprising in addition recessed members secured to the center portions of the diaphragms of the first mentioned regulator, and a pin having its ends received in said recesses forming a compression link between the diaphragms.

4. The invention defined in claim 2 comprising in addition passage means connecting the said center compartment to the air passage, and a manually operated valve and a valve operated automatically in response to variations in pressure resulting from variations in altitude for controlling said passage means.

5. The invention defined in claim 2 comprising in addition a spring in the said other end compartment urging the first named valve toward open position, and a member projecting through the wall of the casing and operative from a point remote from the engine for renducing the valve opening effectiveness of the said spring.

6. In a charge forming device for an internal combustion engine, a control element, a pair of spaced parallel diaphragms for controlling the element, said diaphragms being subjected to pressures varying with variations in engine operation and being urged toward each other by the pressures, substantially cylindrically recessed members secured to the center portions of said diaphragms, and a rod having its ends freely received in the recesses forming a compression link therebetween.

7. In a pressure responsive mechanism, a pair of spaced parallel coaxial diaphragms, abutment members secured to the center portions of the diaphragms, a rod-like member forming a compression link between the diaphragms and being connected thereto by one-way recess and sliding pin connections, a control element, means for subjecting the diaphragms to pressures urging each diaphragm toward the other and urging the diaphragms and rod-like member assembly in either of two directions, and an operative connection between the control element and one of the diaphragms.

8. In a charge forming device: an air passage; a venturi and a throttle therein; a discharge nozzle extending transversely across the air passage posterior to the throttle, a passageway extending across the air passage within the nozzle, a discharge opening in an intermediate portion of the nozzle in communication with the passageway; means for supplying air from the air passage anterior to the throttle to one end of the passageway; a fuel conduit leading from a source of fuel under pressure to the other end of the passageway; and means for controlling the flow of fuel comprising a metering orifice in the conduit, a pair of fuel valves anterior and posterior to the orifice, and means responsive to the pressures in the air passage, at the venturi, in the fuel conduit anterior to the orifice, and in the fuel conduit posterior to the orifice for controlling said valves to regulate the fuel pressure upstream of the orifice and fuel pressure downstream of the orifice, each independently of the other.

9. The invention in claim 8 wherein the discharge nozzle also comprises a disc within the passageway adjacent the discharge opening dividing the passageway into two distinct portions respectively supplying air and fuel to the discharge opening.

10. In a charge forming device: an induction passage; a venturi therein; a fuel conduit; a metering restriction in the conduit; a valve in the conduit anterior to the restriction for controlling only unmetered fuel pressure; a casing; a pair of flexible diaphragms and an inflexible wall therebetween located in the casing whereby said casing is divided into a plurality of chambers; means connecting the diaphragms and the valve; means connecting one of the chambers with the throat of the venturi whereby the pressure in said venturi is transmitted to said chamber to urge one of the diaphragms in a direction to open the valve, means connecting a second and a third of said chambers respectively to atmosphere whereby normal atmospheric pressure only urges both diaphragms in the same direction; and a fourth of said chambers receiving unmetered fuel the pressure of which is adapted to move the diaphragms in the valve closing direction; means including a valve in the conduit posterior to the restriction and a diaphragm urged in opposite directions by the pressure in the Venturi throat and by metered fuel pressure, respectively for controlling only metered fuel pressure; the anterior valve being controlled independently of metered fuel pressure and the posterior valve being controlled independently of metered fuel pressure; and a discharge nozzle in the induction passage posterior to the throttle.

11. In a charge forming device for an internal combustion engine: an air supply passage having throttle means therein; a chamber subjected to air supply pressure; a second chamber; means in the passage for creating a differential between the pressures in the chambers; a fuel supply conduit; area restricting means in the fuel supply conduit; means for supplying fuel under pressure to the conduit; valve means for controlling the fuel pressure on the upstream side of said area restricting means, said valve means being controlled by the pressures in said chambers and by only unmetered fuel pressure on the upstream side of the restricting mean; second valve means controlling the fuel flow on the downstream side of said area restricting means, said second valve means being controlled by air pressure in said second chamber and by fuel pressure on the downstream side only of said area restricting means; a valve for varying the effective area of the area restricting means, said valve having a plurality of steps adapted to cooperate with said area restricting means for varying the effective area thereof; and means including a diaphragm subjected on opposite sides to the pressure in the second chamber and unmetered fuel pressure only for positioning said valve.

12. In a charge forming device for an internal combustion engine: an air supply passage having throttle means therein; means for creating a differential of pressures in said air passage; a fuel supply conduit; a metering restriction in the fuel supply conduit; means, including a valve, for controlling the pressure of fuel on the upstream side of said metering restriction, said means being controlled by fuel pressure on the upstream side of said metering restriction and by the pressures created by the second mentioned means; other means, including a valve, for controlling the fuel pressure on the downstream side of said metering restriction independently of the means for controlling the fuel pressure on the upstream side of the metering restriction, said other means being controlled by one of said differential pressures and by fuel pressure on the downstream side only of said metering restriction.

13. In a charge forming device for an internal combustion engine: an air supply passage; a throttle therein; a mixing chamber posterior to the throttle; a pair of air chambers; means in the air passage anterior to the throttle for creating a differential between the pressures in the air chambers; a fuel conduit receiving liquid fuel from a source, and discharging in the mixing chamber; fuel metering means in the conduit; an inlet valve and an outlet valve in the conduit anterior and posterior to the metering means; control means for the valve responsive to the pressure in the air chambers and to fuel pressures in the conduit anterior and posterior to the fuel metering means; a spring for urging the inlet valve toward open position; a second spring for urging the outlet valve toward closed position; a manually operated mixture control element movable between a mixture rich and a mixture lean position; and means actuated by movement of said element beyond one of said positions and varying the setting of one of said springs.

14. In a charge forming device: an air passage; a venturi therein; a throttle in the passage posterior to the venturi; a fuel conduit; spaced control valves in said conduit; a metering restriction in the conduit between said valves; a pair of diaphragms of unequal areas operably connected with the valve anterior to the restriction and urged in opposite directions by the pressure in the air passage and by fuel pressure between the restriction and said valve, independently of the fuel pressure posterior to the restriction, for controlling only fuel pressure anterior to the restriction; and a diaphragm operably connected to the other valve, said diaphragm being urged in opposite directions by the pressure at the venturi and the fuel pressure posterior to the restriction, independently of the fuel pressure anterior to the restriction, for controlling only posterior fuel pressure; and a discharge nozzle in the air passage posterior to the throttle.

15. In a charge forming device for an internal combustion engine: an air duct; an air chamber subjected to a pressure varying in accordance with the air supplied to the duct; a second air chamber; a device in the passage connected to the second air chamber for creating a pressure differential between these chambers; a fuel metering restriction in the conduit; valves in the conduit anterior and posterior to the metering restriction for controlling the fuel pressure upstream and downstream of said restriction respectively, each fuel pressure being controlled independently of the other; means for controlling the valve anterior to the restriction including a pair of spaced diaphragms of unequal area, the air pressures in said chambers being applied to three sides of said diaphragms and fuel pressure being applied to the fourth side; and means for controlling the valve posterior to the restriction including a diaphragm subjected on one side to fuel pressure posterior to the restriction and to the pressure in the second mentioned chamber.

16. A charge forming device for an internal combustion engine comprising an air supply passage, a venturi and a throttle posterior thereto in the passage, an air chamber subjected to air supply pressure, a second air chamber connected to the venturi, a fuel conduit leading from a source of fuel under pressure, a fuel metering restriction in the conduit, a pair of fuel valves in the conduit anterior and posterior to the metering restriction for variably controlling the fuel pressures anterior and posterior to the restriction, each pressure being controlled independently of the other, means responsive to only one of said fuel pressures and to the air pressure in only one of said chambers for controlling one of the valves, and means responsive to only the other of said fuel pressures and to the air pressures in both of said chambers for controlling the other of said valves; a pair of springs operatively connected to said valves, said springs and valves being so constructed and arranged that with zero differential of the air chamber pressures the unmetered fuel pressure is greater than the metered fuel pressure, and an idle cut off, including a member operable from a point remote from the engine for varying the setting of at least one of said springs.

17. In a charge forming device for an internal combustion engine: an air supply passage having a throttle therein; a chamber subjected to air supply pressure; a second chamber; means in the passage, including an air connection with the second chamber, for creating a differential between the pressures in the chambers; a fuel supply conduit; a calibrated metering jet in the fuel supply passage; valve means in the conduit for controlling the flow of fuel therethrough; control means for the valve means operative to maintain the pressure differential across the metering jet in substantially constant proportion to the differential between the pressures in said chambers; a valve cooperating with the metering jet for varying the effective area thereof; means including a diaphragm subjected on opposite sides to fuel pressure upstream of the jet and to the pressure in the second chamber for positioning said valve; said last mentioned means including a spring loaded stop normally limiting valve opening movement of the diaphragm and adapted to yield when the differential in the pressures on opposite sides of the diaphragm exceeds a predetermined value; and a member operated by the throttle for further limiting valve opening movement of the diaphragm.

18. In a charge forming device: an air passage; a venturi in the passage; a throttle in the passage posterior to the venturi; a fuel conduit leading from a source of fuel under pressure to the induction passage; a fuel metering restriction in the conduit; inlet and outlet valves in the conduit anterior and posterior to the metering restriction for respectively controlling the supply of fuel to and from said restriction; means operatively connected to the inlet valve for controlling same to regulate the fuel pressure upstream of said restriction independently of the fuel pressure downstream thereof and including means responsive to variations in the air supply pressure, the pressure at the venturi, and only fuel pressure upstream of the metering restriction; means operatively connected to the outlet valve for controlling same to regulate the fuel pressure downstream of the metering restriction independently of the fuel pressure upstream thereof, including means responsive to variations in the pressure at the venturi and only fuel pressure downstream of the metering means; a spring urging the inlet valve toward open position in opposition to the pressure of fuel, upstream of the metering restriction, on the first named pressure responsive means; and a second spring urging the outlet valve toward closed position in opposition to the pressure of the fuel, downstream of the metering restriction, on the second named pressure responsive means, said springs being of such relative strength that the fuel pressure downstream of the metering restriction required to open the outlet valve at zero air flow to the engine is less than the fuel pressure upstream of the metering restriction required to close the inlet valve whereby an enrichment at idling is obtained.

19. In a fuel supplying device for an internal combustion engine: an air supply passage and a fuel supply conduit; a chamber subjected to air supply pressure; a second chamber; flow responsive means in the air passage for creating a differential of pressures in said chambers; a metering jet in the fuel supply conduit; an inlet valve in the fuel conduit anterior to the jet for regulating the pressure of the fuel only on the upstream side of said jet; means, responsive to the pressures in both of said chambers and to fuel pressure derived solely from the fuel conduit between the valve and the jet, operatively connected to said valve for controlling the same; an outlet valve in the fuel conduit posterior to the area restricting means for regulating the pressure of the fuel only on the downstream side of the jet; means, responsive to the pressures in the said second chamber and to fuel pressures derived solely from the fuel conduit between the jet and the outlet valve, operatively connected to the outlet valve for controlling the same; a spring for urging the inlet valve toward open position; a second spring for urging the outlet valve toward closed position; a manually operated mixture control element movable from a mixture rich to a mixture lean position; and means actuated by movement of said element beyond a mixture lean position for varying the setting of one of said springs.

FREDERIK BARFOD.
EMIL O. WIRTH.

REFERENCES CITED

The following references are of record in the file of this patent:

UNITED STATES PATENTS

| Number | Name | Date |
| --- | --- | --- |
| 1,333,986 | Lundgaard | Mar. 16, 1920 |
| 1,539,732 | Hartl | May 26, 1925 |
| 1,890,196 | Schramm et al. | Dec. 6, 1932 |
| 1,906,554 | Dodds | May 2, 1933 |
| 1,978,660 | Wynne et al. | Oct. 30, 1934 |
| 2,139,804 | Chandler | Dec. 13, 1938 |
| 2,165,447 | Browne | July 11, 1939 |
| 2,199,509 | Olson | May 7, 1940 |
| 2,216,422 | Schimanek | Oct. 1, 1940 |
| 2,283,021 | Udale | May 12, 1942 |
| 2,310,984 | Mock et al. | Feb. 16, 1943 |
| 2,330,650 | Weiche | Sept. 28, 1943 |
| 2,341,257 | Wunsch | Feb. 8, 1944 |
| 2,361,227 | Mock | Oct. 24, 1944 |
| 2,348,008 | Hunt | May 2, 1944 |

FOREIGN PATENTS

| Number | Country | Date |
| --- | --- | --- |
| 523,895 | Great Britain | July 25, 1940 |
| 822,090 | France | Sept. 13, 1937 |
| 846,778 | France | June 12, 1939 |